US008885883B2

United States Patent
Goodman

(10) Patent No.: US 8,885,883 B2
(45) Date of Patent: Nov. 11, 2014

(54) ENHANCING GMAPD LADAR IMAGES USING 3-D WALLIS STATISTICAL DIFFERENCING

(75) Inventor: Vernon R. Goodman, Rockwall, TX (US)

(73) Assignee: Raytheon Company, Waltham, MA (US)

(*) Notice: Subject to any disclaimer, the term of this patent is extended or adjusted under 35 U.S.C. 154(b) by 193 days.

(21) Appl. No.: 13/554,589

(22) Filed: Jul. 20, 2012

(65) Prior Publication Data

US 2013/0022241 A1 Jan. 24, 2013

Related U.S. Application Data

(60) Provisional application No. 61/511,003, filed on Jul. 22, 2011.

(51) Int. Cl.
| | | |
|---|---|---|
| *G06K 9/00* | (2006.01) | |
| *G01S 7/48* | (2006.01) | |
| *G01S 17/87* | (2006.01) | |
| *G01S 17/89* | (2006.01) | |
| *G01S 7/487* | (2006.01) | |
| *G01S 17/93* | (2006.01) | |

(52) U.S. Cl.
CPC .............. *G01S 7/4808* (2013.01); *G01S 17/87* (2013.01); *G01S 17/89* (2013.01); *G01S 17/936* (2013.01); *G01S 7/487* (2013.01)
USPC .......................................... 382/103; 382/154

(58) Field of Classification Search
CPC .......... G06K 9/46; G01S 17/936; G01S 17/89
USPC ........ 382/100, 103–104, 154; 356/3.01, 4.01, 356/4.1, 5.01, 9, 625; 348/135, 46; 702/181, 150, 5; 703/6; 700/245, 248, 700/257–259, 266, 281
See application file for complete search history.

(56) References Cited

U.S. PATENT DOCUMENTS

| | | |
|---|---|---|
| 3,396,365 A | 8/1968 | Kerns |
| 4,052,889 A | 10/1977 | Mucciardi et al. |
| 4,780,859 A | 10/1988 | Hadidi et al. |
| 4,853,903 A | 8/1989 | Linville, Jr. et al. |
| 4,884,247 A | 11/1989 | Hadidi et al. |
| 4,922,362 A | 5/1990 | Miller et al. |
| 5,574,553 A | 11/1996 | McManamon et al. |
| 5,644,386 A | 7/1997 | Jenkins et al. |
| 6,061,419 A | 5/2000 | Hsieh et al. |
| 6,295,373 B1 | 9/2001 | Mahalanobis et al. |
| 6,304,684 B1 | 10/2001 | Niczyporuk et al. |

(Continued)

OTHER PUBLICATIONS

Hiroyo Ishikawa, Hideo Saito, "Point Cloud Representation of 3D shape for laser-Plasma Scanning 3D Display", IEEE 2008, ID No. 978-1-4244-1766-7/08 pp. 1913-1918.*

(Continued)

*Primary Examiner* — Hadi Akhavannik
*Assistant Examiner* — Mehdi Rashidian
(74) *Attorney, Agent, or Firm* — Cantor Colburn LLP

(57) ABSTRACT

A method for processing XYZ point cloud of a scene acquired by a GmAPD LADAR includes: performing on a computing device a three-dimensional statistical differencing on the XYZ point cloud obtained from the GmAPD LADAR to produce a SD point cloud; and displaying an image of the SD point cloud.

16 Claims, 4 Drawing Sheets

(56) References Cited

U.S. PATENT DOCUMENTS

| | | | |
|---|---|---|---|
| 6,535,275 | B2 | 3/2003 | McCaffrey et al. |
| 6,608,585 | B2 | 8/2003 | Benitz |
| 6,798,860 | B1 | 9/2004 | Hsieh et al. |
| 7,053,820 | B2 | 5/2006 | Goodman et al. |
| 7,139,067 | B2 | 11/2006 | Pohle et al. |
| 7,215,430 | B2 | 5/2007 | Kacyra et al. |
| 7,248,343 | B2 | 7/2007 | Cardero et al. |
| 7,301,608 | B1* | 11/2007 | Mendenhall et al. ........ 356/4.01 |
| 7,304,645 | B2 | 12/2007 | Blask et al. |
| 7,361,882 | B2 | 4/2008 | Forsyth |
| 7,439,509 | B1 | 10/2008 | Grazioso et al. |
| 7,471,813 | B2 | 12/2008 | Ulmer et al. |
| 7,474,332 | B2 | 1/2009 | Byren |
| 7,518,095 | B2 | 4/2009 | Forsyth |
| 7,547,872 | B2 | 6/2009 | Niclass et al. |
| 7,571,081 | B2 | 8/2009 | Faulkner et al. |
| 7,646,845 | B2 | 1/2010 | Lecomte et al. |
| 7,675,610 | B2 | 3/2010 | Redman et al. |
| 7,782,708 | B2 | 8/2010 | Christie et al. |
| 7,789,831 | B2 | 9/2010 | Barnes et al. |
| 7,800,070 | B2 | 9/2010 | Weinberg et al. |
| 7,825,384 | B1 | 11/2010 | Saveliev |
| 8,024,066 | B2* | 9/2011 | Reverte et al. ................. 700/245 |
| 8,659,747 | B2* | 2/2014 | Goodman .................... 356/4.01 |
| 2008/0094605 | A1 | 4/2008 | Drodofsky et al. |
| 2008/0137059 | A1 | 6/2008 | Piestun et al. |
| 2012/0320363 | A1* | 12/2012 | Goodman .................... 356/4.01 |
| 2013/0300838 | A1* | 11/2013 | Borowski ........................ 348/46 |

OTHER PUBLICATIONS

Albota, Marius et al, "Three-dimensional imaging lasar radar with a photon-counting avalanche photodiode array and microchip laser", Applied Optics, 2002, vol. 41, No. 36, pp. 7671-7678.

Brad, Remus, "Satellite Image Enhancement by Controlled Statistical Differentiation", Innovations and Advanced Techniques in Systems, Computing Sciences and Software Engineering, 2008, pp. 32-36.

Cho, Peter et al., "Real-Time 3D Ladar Imaging" IEEE Computer Society, 35th Applied Imagery and Pattern Recognition Workshop, 2006, 7 pages.

Gallardo-Hernando, B. et al , "Performance Evaluation for Imaging Laser Radars with Focal Plane Array", Institution of Engineering and Technology, IET International Conference on Radar Systems 2007, IET Conference Publications 530, pp. 14-18.

Gilsinn, David E. et al., "Deconvolving LADAR Images of Bar Codes for Construction Site Object Recognition", U.S. Department of Commerce Technology Administration National Institute of Standards and Technology, Gaithersburg, MD, Published Oct. 1, 2003, pp. 1-129.

Gilsinn, David E. et al, "Reconstructing Images of Bar Codes for Construction Site Object Recognition", International Symposium on Automation and Robotics in Construction, 19th (ISARC) Proceedings. National Institute of Standards and Technology (NIST), Gaithersburg, MD, Sep. 2002, 6 Pages.

Gluchev, Georgi, "Contrast Enhancement of Portal Images with Adaptive Histogram Clip", Institute of Information Technologies, 1113 Sofia, Bulgaria, 1998, 7 pages.

Justice, James H., "A Levinson-Type Algorithm for Two-Dimensional Wiener Filtering Using Bivariate Szego Polynomials", Proceedings of the IEEE, vol. 65, No. 6, Jun. 1977, pp. 882-886.

Lin, Hong-Dun et al , "Statistical-Based Sub-Band Filtering Technique for Digital Mammogram Enhancement", Department of Electrical Engineering, Chung-Yuan Uiversity, Chung-Li Taiwan, Aug. 2003, pp. 18-24.

Manolakis, D. et al, "Efficient Determination of FIR Wiener Filters with Linear Phase", Department of Electronics, University of Athens, Greece, Mar. 1982, 3 pages.

Motulsky, Harvey, "Analyzing Data with GraphPad Prism", GraphPad Software, Inc., Published 2009, found at www.graphpad.com, 10 Pages.

Pratt, William K., "Superposition and Convolution", PIKS Scientific Inside, Fourth Edition, 2007, pp. 165-187.

Ramaswami, Prem et al, "Coincidence Processing of Geiger-Mode 3D Laser—Radar Data" , MIT Lincoln Laboratory, Lexington, MA, Published 2006, Optical Society of America, 39 pages.

Wallace, A.M., "Detecting and characterising returns in a pulsed ladar system", IEE Proc.-Vis. Image Signal Process., vol. 153, No. 2, Apr. 2006, pp. 160-172.

Yang, Changjiang et al , "Improved Fast Gauss Transform and Efficient Kernal Density Estimation", IEEE Computer Society, Ninth IEEE International Conference on Computer Vision, 2-Volume Set, 2003, 8 Pages.

Yao, Zhengsheng, "Optimal time-delay spiking deconvolution and its application in the physical model measurement", CREWES Research Report, 1999, vol. 11, 7 Pages.

* cited by examiner

ENHANCING GMAPD LADAR IMAGES USING 3-D WALLIS STATISTICAL DIFFERENCING

CROSS-REFERENCE TO RELATED APPLICATION

This application is a non-provisional of U.S. patent application Ser. No. 61/511,003, filed Jul. 22, 2011, the disclosure of which is incorporated by reference herein in its entirety.

BACKGROUND

This disclosure relates generally to the field of imaging and more particularly to enhancing images obtained from Geiger-mode avalanche photodiode detectors using three-dimensional statistical differencing.

Imaging sensors, such as laser radar sensors (LADARs), acquire point clouds of a scene. The point cloud may be represented as a set of vertices (points) defined in particular coordinate system (e.g., X, Y, Z coordinates). The point clouds of the scene are then image processed to generate three-dimensional (3D) models of the actual environment present in the scene. The image processing used to create the 3D models can enhance the visualization and interpretation of the scene. Typical applications include surface measurements in airborne and ground-based industrial, commercial and military scanning applications such as site surveillance, terrain mapping, reconnaissance, bathymetry, autonomous control navigation and collision avoidance and the detection, ranging and recognition of remote military targets.

Presently there exist many types of LADARs for acquiring point clouds of a scene. A point cloud acquired by a LADAR typically comprise X, Y and Z coordinates from which range to target, two spatial angular measurements and strength (i.e., intensity) may be computed. However, the origins of many of the individual data points in the point cloud are indistinguishable from one another. As a result, most computations employed to generate the 3D models treat all of the points in the point cloud the same, thereby resulting in indistinguishable "humps/bumps" on the 3-D surface model of the scene.

In addition, various imaging processing techniques have been employed to reconstruct or otherwise clean up a blurred image of the scene. The blurring, or convolution, of the image is a result of the low resolution (i.e., the number of pixels/unit area) that may be obtained due to long distances between the image and the detector (e.g., low intensity) and distortion of the intensity image by the LADAR optics and by data processing. Accordingly, the image must be de-blurred (deconvolved).

In some cases LADARs include comprise arrays of avalanche photodiode (APD) detectors operating in Geiger-mode (hereinafter "GmAPD") that are capable of detecting single photons incident onto one of the detectors. For example, FIG. 1 diagrammatically depicts a typical GmAPD LADAR system 10 that includes a focal plane array 12 of avalanche photodiode (APD) detectors 14 operating in Geiger-mode. Integrated timing and readout circuitry (not shown) is provided for each detector 14. In typical operation, a laser pulse emitted from a microchip laser 16 passes through a bandpass filter 18, variable divergence optics 20, a half-wave plate 22, a polarizing beam splitter 24, and is then directed via mirrors 26 and 28 through a beam expander 30 and a quarter wave plate 32. Scanning mirrors 34 then steer the laser pulses to scan the scene 36 of interest. It is noted that the scanning mirrors 34 may allow the imaging of large areas from a single angle of incidence or small areas imaged from a variety of angles on a single pass. Return reflections of the pulse from objects in the scene 36 (e.g., tree and tank) pass in the opposite direction through the polarizing beam splitter 24, a narrow band filter 38, and then through a zoom lens 40 onto the detector array 12. The outputs of the detector array 12 form a point cloud 42 of X, Y, Z data are then provided to an image processor 44 for viewing on a display 46.

More particularly, the operation of a GmAPD LADAR 10 may occur as follows. After the transmit laser pulse leaves the GmAPD LADAR 10, the detectors 14 are overbiased into Geiger-mode for a short time, corresponding to the expected time of arrival of the return pulse. The window in time when the GmAPD LADAR 10 is armed (e.g., the time the detectors 14 are overbiased) to receive the return pulse is known as the range gate. During the range gate the array 12 and the detectors 14 are sensitive to single photons. The high quantum efficiency in the array results in a high probability of generating a photoelectron. The few volts of overbias ensure that each free electron has a high probability of creating the growing avalanche which produces the volt-level pulse that is detected by the CMOS readout circuitry (not shown) of the array 12. This operation is more particularly described in U.S. Pat. No. 7,301,608, the disclosure of which is hereby incorporated by reference herein.

Unfortunately, during photon detection, the GmAPD system 10 does not distinguish among free electrons generated from laser pulses, background light, and thermal excitations within the absorber region (dark counts). High background and dark count rates are directly detrimental because they introduce noise (see FIG. 7 of U.S. Pat. No. 7,301,608) and are indirectly detrimental because they reduce the effective sensitivity to signal photons that arrive later in the range gate. See generally, M. Albota, "Three-dimensional imaging laser radar with a photon-counting avalanche photodiode array and microstrip laser", *Applied Optics*, Vol. 41, No. 36, Dec. 20, 2002, the disclosure of which is hereby incorporated by reference herein. Nevertheless single photon counting GmAPD systems are favored due to efficient use of the power-aperture.

There presently exist several techniques for extracting the desired signal from the noise in a point cloud acquired by a GmAPD LADAR. Representative techniques include Z-Coincidence Processing (ZCP) that counts the number of points in fixed-size voxels to determine if a single return point is noise or a true return, Neighborhood Coincidence Processing (NCP) that considers points in neighboring voxels, and various hybrids thereof (NCP/ZCP). See P. Ramaswami, "Coincidence Processing of Geiger-Mode 3D Laser Radar Data", *Optical, Society of America*, 2006, the disclosure of which is hereby incorporated by reference herein.

In addition to removal of noise from a point cloud through the use of NCP or ZCP techniques, it is often desirable to enhance the resulting image. Prior art image enhancement techniques include unsharp masking techniques using a high-pass filter, techniques for emphasizing medium-contrast details more than large-contrast details using adaptive filters and statistical differential techniques that provide high enhancement in edges while presenting a low effect on homogenous areas.

As described in B. Remus, "Satellite Image Enhancement by Controlled Statistical Differentiation", pp. 32-36, *Innovations and Advanced Techniques in Systems Computing Sciences and Software Engineering*, Springer Science+Business Media B.V. 2008, the disclosure of which is hereby incorporated by reference herein, statistical differention implies the division of original pixels $F(j,k)$ by their standard deviation $S(j,k)$:

$$G(j, k) = \frac{F(j, k)}{S(j, k)} \quad (1)$$

where:

$$S(j, k) = \frac{1}{W^2} \sum_{m=j-w}^{j+w} \sum_{n=k-w}^{k+w} [F(m, n) - M(j, k)]^2 \quad (2)$$

is the standard deviation computed for every pixel on a W×W window and W=2w+1. M(j,k) represents the estimated mean value for the pixel having coordinates (j,k) and computed on a same sized window:

$$M(j, k) = \frac{1}{W^2} \sum_{m+j-w}^{j+w} \sum_{n=k-w}^{k+w} F(m, n) \quad (3)$$

The enhanced image, G(j,k), has a significant increase in magnitude for pixels that are different from neighbors and a decrease of magnitude for similar pixels.

Another approach for enhancement includes:

$$G(j,k)=M(j,k)+A(F(j,k)-M(j,k)) \quad (4)$$

with A, a constant influencing the degree of enhancement, having current values in the range of [0.2, 0.7].

As set described in R. H. Wallis, "An Approach for the Space Variant Restoration and Enhancement of Images", *Proceedings Symposium on Current Mathematical Problems in Image Science*, Monterey, Calif., November, 1976, the disclosure of which is hereby incorporated by reference herein, the approach set forth by formula (4) above, may be extended to:

$$G(j, k) = M_d + \frac{S_d}{S(j, k)} (F(j, k) - M(j, k)) \quad (5)$$

employing a desired mean value, $M_d$, and a desired standard deviation, $S_d$.

Wallis also describes a generalization of the differencing operation in which the enhanced image is forced to a specific form, which desired first-order and second-order moments:

$$G(j, k) = [F(j, k) - M(j, k)] \left[ \frac{AS_d}{AS(j, k) - S_d} \right] + [rM_d + (1 - r)M(j, k)] \quad (6)$$

SUMMARY OF THE INVENTION

According to one embodiment, a method for processing XYZ point cloud of a scene acquired by a GmAPD LADAR is disclosed. The method of this embodiment includes: performing a three-dimensional statistical differencing on a computing device on the XYZ point cloud obtained from the GmAPD LADAR to produce a SD point cloud; and displaying an image of the SD point cloud.

According to another embodiment, a method for processing a XYZ point cloud of a scene acquired by a GmAPD LADAR is disclosed. The method of this embodiment includes: Z-clipping on a computing device the XYZ point cloud by adaptive histogramming to produce a Z-clipped point cloud; performing Wallis dimensional statistical differencing in three dimensions on the Z-clipped point cloud to produce a WSD point cloud. In this embodiment, the Wallis statistical differencing in three dimensions occurs according to the following algorithm:

$$G(j, k, l) = [F(j, k, l) - M(j, k, l)],$$
$$\left[ \frac{A + S_d}{A + S(j, k, l) - S_d} \right] + [r + M_d + (1 - r) + M(j, k, l)]$$

where M(j,k,l) is the estimated local mean over a W×W×W neighborhood, and where W=2w+1:

$$M(j, k, l) = \frac{1}{W^3} \sum_{m+j-w}^{j+w} \sum_{m+k-w}^{k+w} \sum_{m+l-w}^{l+w} F(m, n, p)$$

and S(j,k,l) is the estimated local standard deviation over that same neighborhood and equals $$S(j, k, l) = \frac{1}{W^3} \sum_{m+j-w}^{j+w} \sum_{m+k-w}^{k+w} \sum_{m+l-w}^{l+w} [F(m, n, p) - M\{m, n, p\}]^2$$

wherein at least one of $M_d$ and $S_d$ A and r comprise an operator-selectable command-line parameter. The method further includes: thresholding the WSD point cloud to produce a first thresholded point cloud; sharpening the first thresholded point cloud in the X-Y plane by highpass filtering to produce a sharpened point cloud; thresholding the sharpened point cloud to produce a second thresholded point cloud; mitigating timing uncertainty in the second thresholded point cloud by deconvolving the second thresholded point cloud in the vertical direction to produce a deconvolved point cloud; thresholding and cleansing the deconvolved point cloud in the vertical direction to produce a thresholded/cleansed point cloud; and displaying an image of the thresholded/cleansed point cloud by counting photons at points in the thresholded/cleansed point cloud.

According to another embodiment, a system for processing a XYZ point cloud of a scene acquired by a GmAPD LADAR includes an image processor that performs a three dimensional statistical differencing on the XYZ point cloud obtained from the GmAPD LADAR to produce a SD point cloud. The system also includes a display for displaying an image of the SD point cloud.

According to another embodiment, a system for processing a XYZ point cloud of a scene acquired by a GmAPD LADAR includes An image processor for Z-clipping the XYZ point cloud adaptive histogramming to produce a Z-clipped point cloud, performing Wallis dimensional statistical differencing in three dimensions on the Z-clipped point cloud to produce a WSD point cloud, thresholding the WSD point cloud to produce a first thresholded point cloud, sharpening the WSD point cloud in the X-Y plane by highpass filtering to produce a sharpened point cloud, thresholding the sharpened point cloud to produce a second thresholded point cloud, mitigating timing uncertainty in the second thresholded point cloud, mitigating timing uncertainty in the second thresholded point cloud by deconvolving the second thresholded point cloud in the vertical direction to produce a deconvolved point cloud, thresholding and cleansing the deconvolved point cloud in the vertical direction to produce a thresholded/cleansed point cloud. The system further includes a display for displaying an image of the thresholded/cleansed point cloud by counting photons at points in the thresholded/cleansed point cloud.

BRIEF DESCRIPTION OF THE DRAWINGS

For a fuller understanding of the present disclosure and its advantages, reference is now made to the following description, taken in conjunction with the accompanying drawings, in which.

Similar reference characters refer to similar parts throughout the several views of the drawings.

DETAILED DESCRIPTION OF THE PREFERRED EMBODIMENT

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
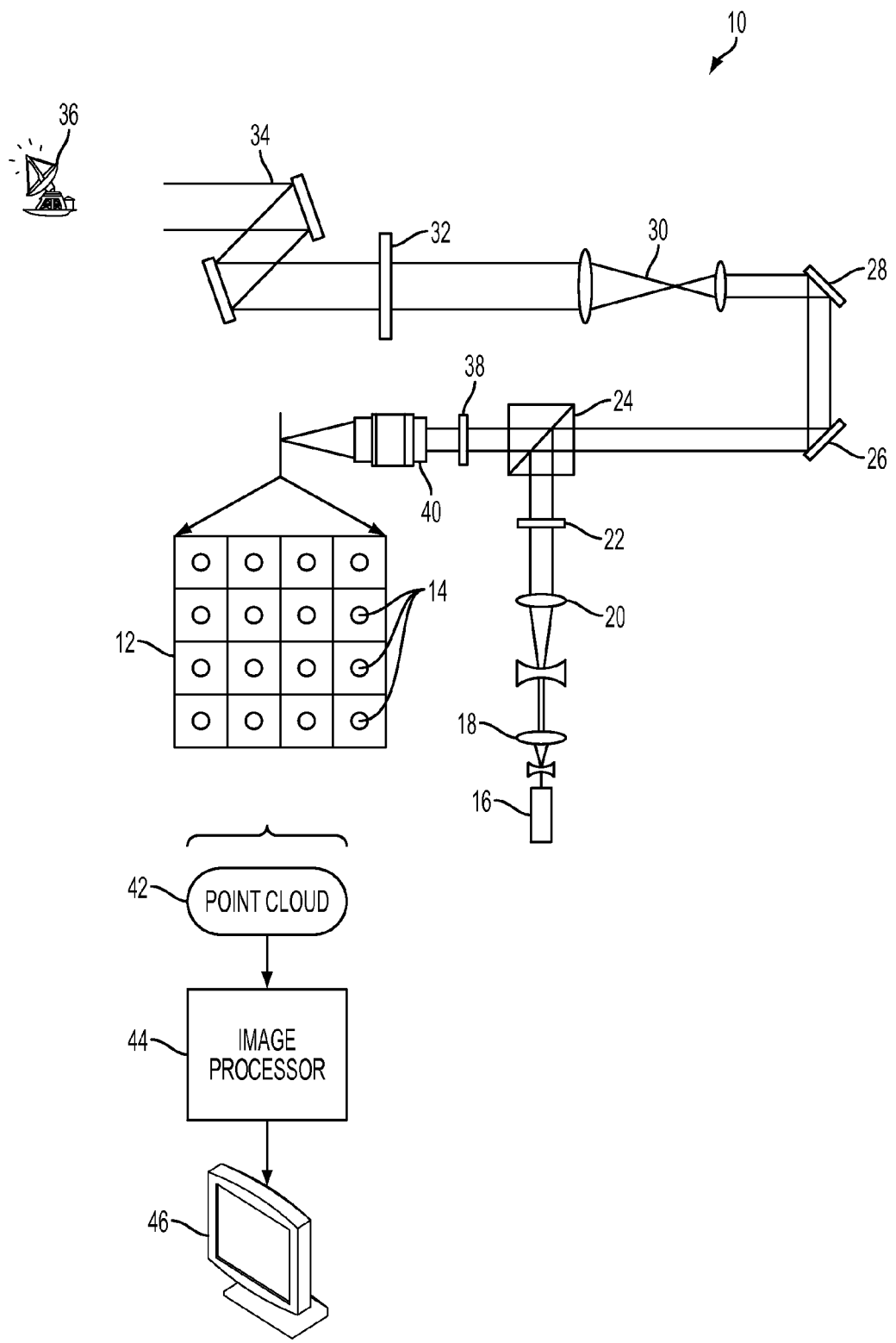
FIG. 1 is a diagrammatic view of a typical GmAPD LADAR that may be employed by the present invention to acquire an XYZ point cloud representing the image of the scene of interest.

The apparatus and method of the invention comprises a typical GmAPD LADAR 10 described above in connection with FIG. 1 to acquire a point cloud 42A of XYZ data of a scene of interest 36 that is provided to an image processor 44. It shall be understood without departing from the spirit and scope of the invention, that neither the apparatus nor method of the invention is limited to any particular type or brand of GmAPD LADARs 10.

Figure 2:
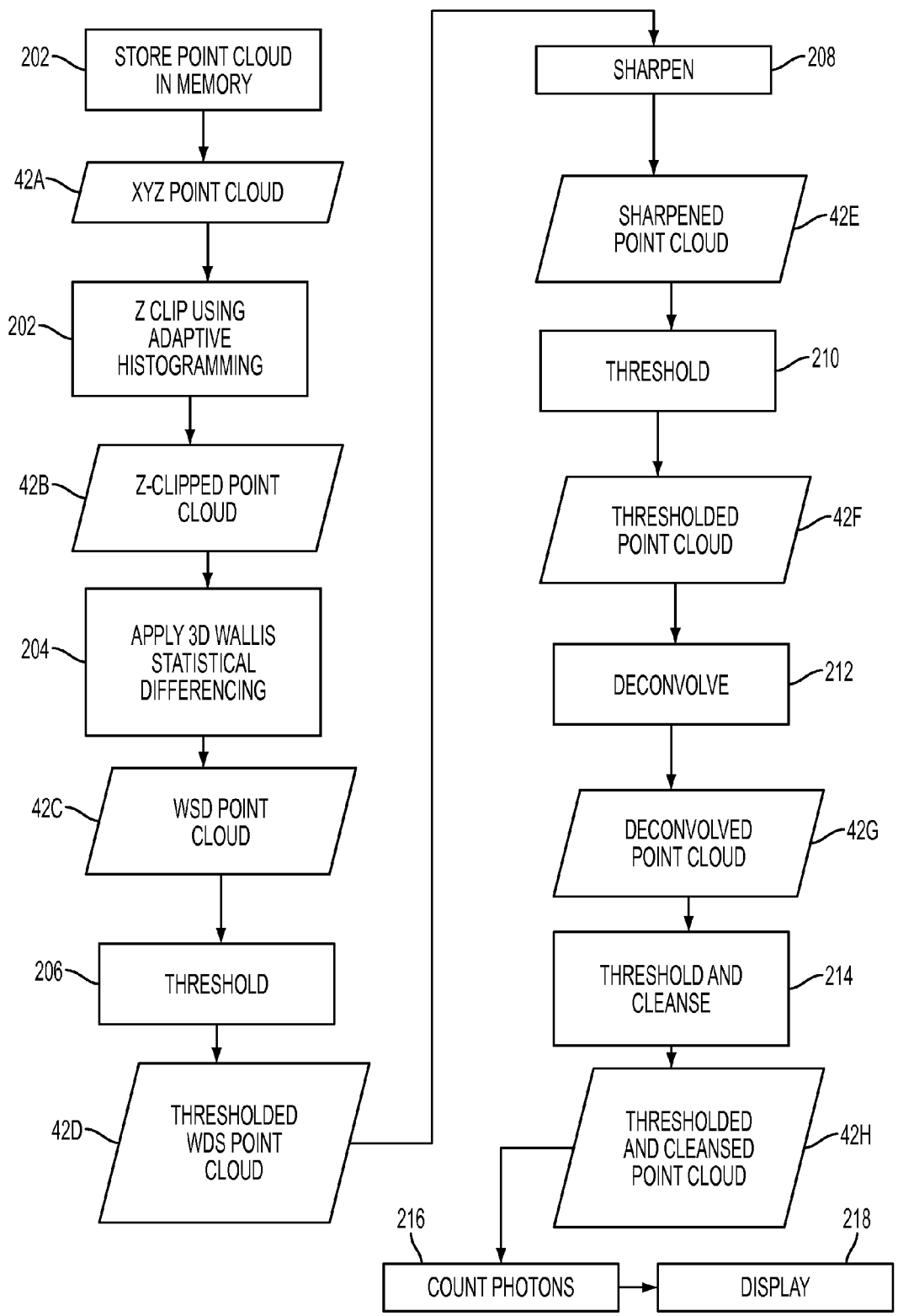
FIG. 2 is a process flow diagram of the method of the invention implemented on an image processor for display or further processing.

The image processor 44 may be embodied in a general purpose computer with a conventional operating system or may constitute a specialized computer without a conventional operating system so long as it is capable of processing the XYZ point cloud 42A in accordance with the process flow diagram of FIG. 2. Further, it shall be understood without departing from the spirit and scope of the invention, that neither the apparatus nor the method of the invention is limited to any particular type or brand of image processor 44. In embodiment, the image processor is configured to perform image processing on the XYZ point clouds obtained from a GmAPD LADAR using three dimensional (3D) Wallis statistical differencing (WSD) followed by highpass filtering and deconvolution. One or more embodiments of the systems and methods disclosed herein may provide one or more of the technical effects/advantages described below. For example, one embodiment may provide cleaner 3D voxelized images at faster processing speeds than traditional coincidence processing. The increased speed can be obtained, for example, by structuring the processing to maximize cache hits. One embodiment may provide for better interpretability of the edges of the scene. Various embodiments of the invention may have none, some or all of these advantages. Other technical advantages of systems and methods disclosed herein will be readily apparent to one skilled in the art. As shown in the data flow diagram of FIG. 2, one embodiment includes a method that begins by storing the XYZ point cloud 42A of data into the memory of the image processor 44 as shown at block 200. The memory may comprise any type or form of memory. The image processor 44 may comprise a computational device such as application specific integrated circuits (ASIC), or a central processing unit (CPU), digital signal processor (DSP) or field-programmable gate arrays (FGPA) containing firmware or software.

Figure 3:
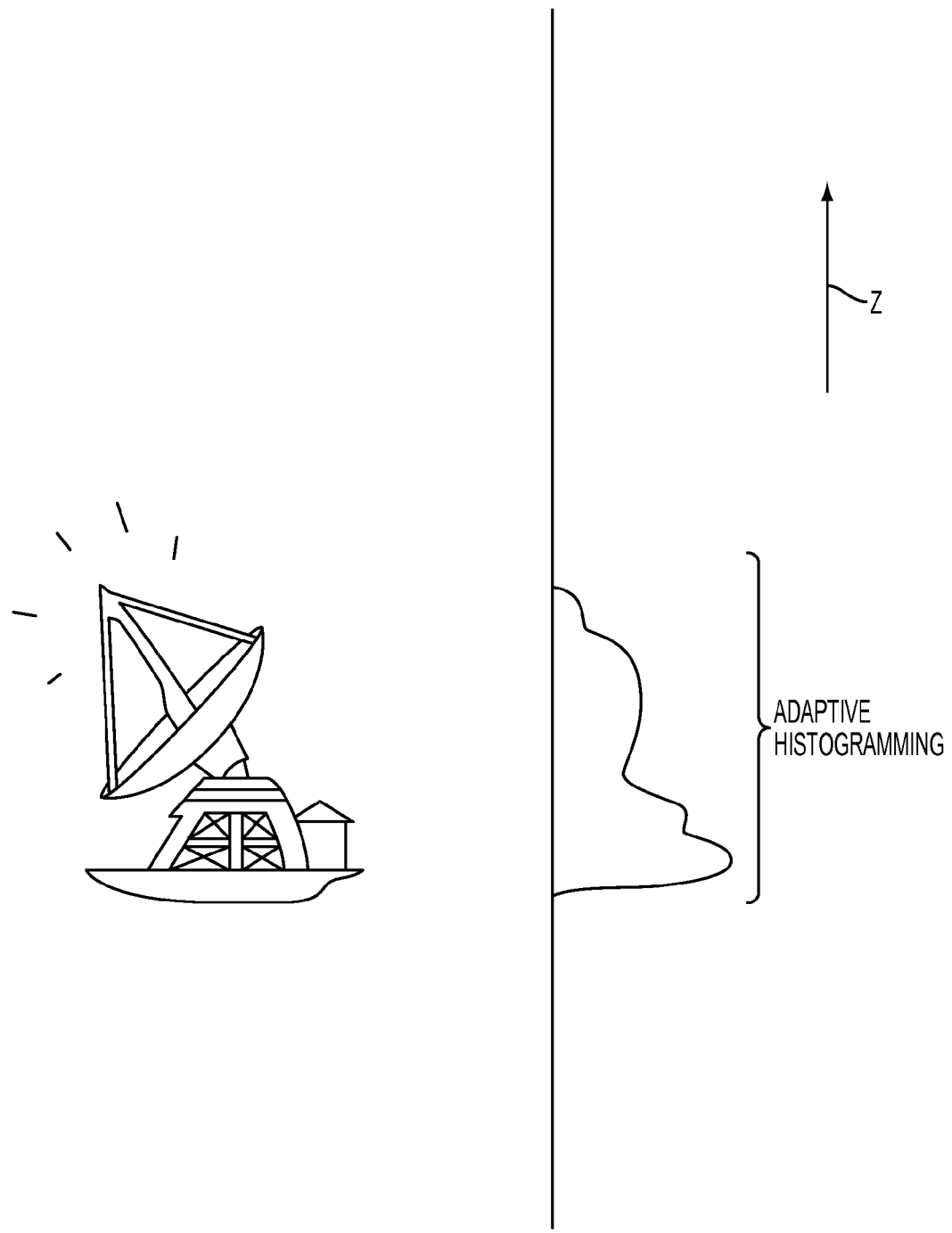
FIG. 3 is a diagrammatic view of adaptive histogramming.

After being stored, the XYZ point cloud 42A is Z-clipped based on adaptive histogramming at block 202 to form a Z-clipped point cloud 42B. The Z-clipping performed at block 202 can include, for example, applying histogram equalization in a window sliding over the image pixel-by-pixel to transform the grey level of the central window pixel. However, to reduce the noise enhancement and distortion of the field edge, as shown in FIG. 3, a contrast-limited adaptive histogram equalization is preferably performed in the Z-direction to clip histograms from the contextual regions before equalization, thereby diminishing the influence of dominate grey levels.

The Z-clipped point cloud 42b then, at block 204, has a 3D Wallis statistical differencing (WSD) algorithm applied to it to convert it into 3D Wallis point cloud 42C. In more detail, in one embodiment, the 2D WSD discussed above is extended such that $$G(j, k, l) = [F(j, k, l) - M(j, k, l)] \cdot \left[ \frac{A \cdot S_d}{A \cdot S(j, k, l) - S_d} \right] + [r \cdot M_d + (1 - r) \cdot M(j, k, l)]$$

where:
$M(j,k,l)$ is the estimated local mean over a W×W×W neighborhood, where W=2w+1

$$M(j, k, l) = \frac{1}{W^3} \sum_{m+j-w}^{j+w} \sum_{m+k-w}^{k+w} \sum_{m+l-w}^{l+w} F(m, n, p);$$

$S(j,k,l)$ is the estimated local standard deviation over that same neighborhood and may be expressed as:

$$S(j, k, l) = \frac{1}{W^3} \sum_{m+j-w}^{j+w} \sum_{m+k-w}^{k+w} \sum_{m+l-w}^{l+w} [F(m, n, p) - M\{m, n, p\}]^2;$$

and
$M_d$ and $S_d$ are desired mean and standard deviation factors, A is a gain factor, and r controls the edge-to-background ratio. In one embodiment, $M_d$, $S_d$ A and r may be implemented through operator-selectable command-line parameters. The resulting WSD point cloud 42C can be saved in memory for further processing.

Figure 4:
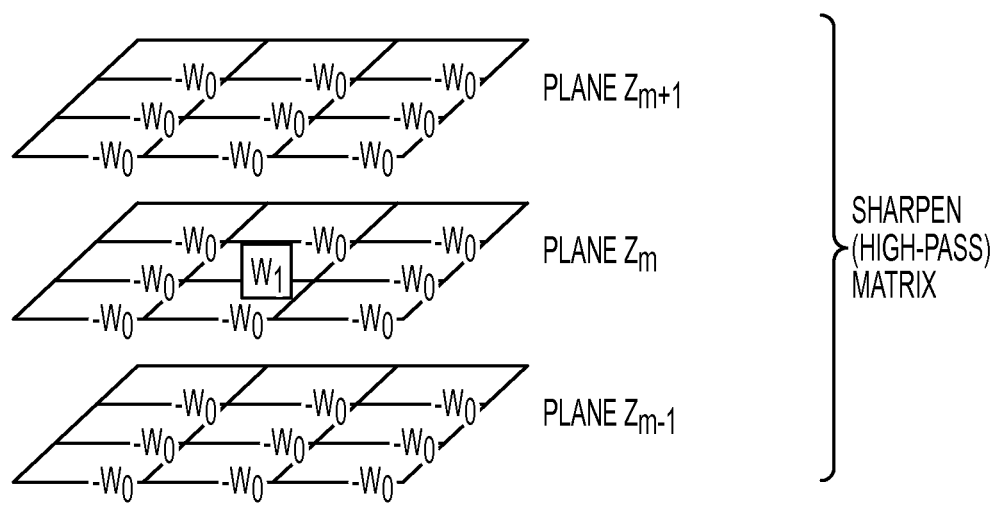
FIG. 4 is a diagrammatic view of the refocusing (highpass) Matrix employed in the method of the invention.

At block 206, the WSD point cloud 42C is thresholded to reduce processing time. The resulting thresholded point cloud 42D may be saved in memory for further processing and is then sharpened into the X-Y plane at block 208. Such sharpening can reduce processing time and may be performed by using a refocus (high-pass) matrix such as shown in FIG. 4. The resulting sharpened point cloud 42E is saved in memory for further processing according to the method of the invention. The sharpened point cloud 42E is thresholded at block 210 to reduce additional noise around the edges of the scene thereby sharpening the image. The resulting thresholded point cloud 42F is saved in memory for further processing according to the method of the invention.

At block 212, the thresholded point cloud 42F is deconvolved in the vertical Z direction { . . . , −d2, −d1, −d0, +d0, +d1, +d2, . . . } using a spiking function to mitigate timing uncertainty. The resulting deconvolved point cloud 42G is saved in memory for further processing according to the method of the invention.

At block 214, the deconvolved point cloud 42G is thresholded and cleansed downwardly in the Z direction to minimize processing. The resulting thresholded/cleansed point cloud 42H is saved in memory for further processing according to the method of the invention. FIG. 10 illustrates an image produced from the thresholded point cloud 42F.

Finally, the thresholded/cleansed point cloud 42H representing the photons returned from the scene, are counted at each point in the scene 46 at block 216 and the resulting image is displayed via display 46 at block 218. It shall be understood that any of the point clouds disclosed herein could be counted and displayed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that embodiments of the invention have been described,

What is claimed is:

1. A method for processing X, Y, Z coordinates (XYZ)point cloud of a scene acquired by a Geiger-mode avalanche photodiode (GmAPD) LADAR, comprising the steps of:
    performing on a computing device a three-dimensional statistical differencing on the XYZ point cloud obtained from the GmAPD LADAR to produce a statistical differencing (SD) point cloud; and
    displaying an image of the SD point cloud;
    wherein the step of performing a three dimensional statistical differencing on the XYZ point cloud comprises performing Wallis statistical differencing in three dimensions to produce a Wallis dimensional statistical differencing (WSD) point cloud and wherein the step of displaying an image of the SD point cloud comprises displaying an image of the WSD point cloud and
    wherein the Wallis statistical differencing in three dimensions occurs according to the following algorithm:

$$G(j,k,l) = [F(j,k,l) - M(j,k,l)],$$

$$\left[\frac{A + S_d}{A + S(j,k,l) \cdot S_d}\right] + [r + M_d + (1-r) + M(j,k,l)]$$

where M(j,k,l) is the estimated local mean over a W×W×W neighborhood, where W=2w+1

$$M(j,k,l) = \frac{1}{W^3} \sum_{m+j-w}^{j+w} \sum_{m+k-w}^{k+w} \sum_{m+l-w}^{l+w} F(m,n,p)$$

and S(j,k,l) is the estimated local standard deviation over that same neighborhood $$S(j,k,l) = \frac{1}{W^3} \sum_{m+j-w}^{j+w} \sum_{m+k-w}^{k+w} \sum_{m+l-w}^{l+w} [F(m,n,p) - M\{m,n,p)]_2$$

$M_d$ and $S_d$ are desired and mean and standard deviation factors, A is a gain factor, and r controls the edge to background ratio.

2. The method as set forth in claim 1, wherein $M_d$ and $S_d$ A and r comprises operator-selectable command-line parameters.

3. The method as set forth in claim 1, wherein the step of displaying an image of the WSD point cloud comprises counting photons at points in the WSD point cloud.

4. The method as set forth in claim 1, further including the step of sharpening the WSD point cloud in the X-Y plane to produce a sharpened cloud and wherein the step of displaying the image of the WSD point cloud comprises displaying the image of the sharpened point cloud.

5. The method as set forth in claim 4, wherein the step of sharpening the WSD point cloud in the X-Y plane to produce the sharpened point cloud comprises highpass filtering.

6. The method as set forth in claim 4, further including the step of thresholding the WSD point cloud to produce a thresholded point cloud and wherein the step of sharpening the WSD point cloud comprises sharpening the thresholded point cloud.

7. The method as set forth in claim 4, further including the step of mitigating timing uncertainty in the WSD point cloud by deconvolution to produce a deconvolved point cloud and wherein the step of displaying an image of the WSD point cloud comprising displaying and image of the deconvolved point cloud.

8. The method as set forth in claim 7, wherein the step of mitigating timing uncertainty in the WSD point cloud by deconvolution comprises deconvoluting the WSD point cloud in the vertical direction.

9. The method as set forth in claim 8, further including the step of thresholding and cleansing the deconvolved point cloud in the vertical direction to produce a thresholded/cleansed point cloud and wherein the step of displaying an image of the deconvolved point cloud comprises displaying an image of the thresholded/cleansed point cloud.

10. The method as set forth in claim 7, further including the step of thresholding the sharpened point cloud to produce a thresholded point cloud and wherein the step of mitigating the timing uncertainty in the WSD point cloud by deconvolution comprises mitigating the timing uncertainty in the thresholded point cloud.

11. The method as set forth in claim 6, further including the step of Z-clipping the XYZ point cloud to produce a Z-clipped point cloud and wherein the step of performing Wallis statistical differencing in three dimensions on the XYZ point cloud comprises performing Wallis statistical differencing in three dimensions on the Z-clipped point cloud.

12. The method as set forth in claim 11, wherein the step of Z-clipping the XYZ point cloud comprises adaptive histogramming.

13. A method for processing an X, Y, Z coordinates (XYZ) point cloud of a scene acquired by a Geiger-mode avalanche photodiode (GmAPD) GMAPD LADAR, comprising the steps of:

Z-clipping on a computing device the XYZ point cloud adaptive by histogramming to produce a Z-clipped point cloud;

performing Wallis dimensional statistical differencing in three dimensions on the Z-clipped point cloud to produce a Wallis dimensional statistical differencing (WSD) point cloud, the Wallis statistical differencing in three dimensions occurring according to the following algorithm:

$$G(j, k, l) = [F(j, k, l) - M(j, k, l)],$$

$$\left[\frac{A + S_d}{A + S(j, k, l) - S_d}\right] + [r + M_d + (1 - r) + M(j, k, l)]$$

where M(j,k,l) is the estimated local mean over a W×W×W neighborhood, where W=2w+1

$$M(j, k, l) = \frac{1}{W^3} \sum_{m+j-w}^{j+w} \sum_{m+k-w}^{k+w} \sum_{m+l-w}^{l+w} F(m, n, p)$$

and S(j,k,l) is the estimated local standard deviation over that same neighborhood $$S(j, k, l) = \frac{1}{W^3} \sum_{m+j-w}^{j+w} \sum_{m+k-w}^{k+w} \sum_{m+l-w}^{l+w} [F(m, n, p) - M\{m, n, p\}]^2$$

wherein at least one of $M_d$ and $S_d$ A and r comprise an operator-selectable command-line parameter;

thresholding the WSD point cloud to produce a first thresholded point cloud;

sharpening the first thresholded point cloud in the X-Y plane by highpass filtering to produce a sharpened point cloud;

thresholding the sharpened point cloud to produce a second thresholded point cloud;

mitigating timing uncertainty in the second thresholded point cloud by deconvolving the second thresholded point cloud in the vertical direction to produce a deconvolved point cloud;

thresholding and cleansing the deconvolved point cloud in the vertical direction to produce a thresholded/cleansed point cloud; and displaying an image of the thresholded/cleansed point cloud by counting photons at points in the thresholded/cleansed point cloud.

14. A system for processing a XYZ point cloud of a scene acquired by a GmAPD LADAR, comprising in combination:

an image processor that performs a three dimensional statistical differencing on the XYZ point cloud obtained from the GmAPD LADAR to produce a SD point cloud; and a display for displaying an image of the SD point cloud;

wherein the image processor performs the three dimensional statistical differencing on the XYZ point cloud by computing a Wallis statistical differencing in three dimensions to produce a WSD point cloud and wherein the display displays an image of the WSD point cloud; and wherein the image processor performs said Wallis statistical differencing in three dimensions occurs according to the following algorithm:

$$G(j, k, l) = [F(j, k, l) - M(j, k, l)],$$

$$\left[\frac{A + S_d}{A + S(j, k, l) - S_d}\right] + [r + M_d + (1 - r) + M(j, k, l)]$$

where M(j,k,l) is the estimated local mean over a W×W×W neighborhood, where W=2w+1

$$M(j, k, l) = \frac{1}{W^3} \sum_{m+j-w}^{j+w} \sum_{m+k-w}^{k+w} \sum_{m+l-w}^{l+w} F(m, n, p)$$

and S(j,k,l) is the estimated local standard deviation over that same neighborhood $$S(j, k, l) = \frac{1}{W^3} \sum_{m+j-w}^{j+w} \sum_{m+k-w}^{k+w} \sum_{m+l-w}^{l+w} [F(m, n, p) - M\{m, n, p\}]_2$$

$M_d$ and $S_d$ are desired and mean and standard deviation factors, A is a gain factor, and r controls the edge to background ratio.

15. The system as set forth in claim 14, wherein $M_d$ and $S_d$ A and r comprise operator-selectable command-line parameters.

16. The system as set forth in claim 14, wherein the image processor sharpens the WSD point cloud in the X-Y plane to produce a sharpened point cloud and wherein the display displaying the image of the WSD point cloud comprises displaying the image of the sharpened point cloud.

* * * * *